Aug. 27, 1968   H. LAMM ET AL   3,398,724
ROTARY PISTON INTERNAL-COMBUSTION ENGINE
Filed Oct. 12, 1966   2 Sheets-Sheet 1

INVENTORS
HEINZ LAMM
LOTHAR KORTNER
HUBERT ZU HOHENLOHE

BY Dicke + Craig
ATTORNEYS

United States Patent Office 3,398,724
Patented Aug. 27, 1968

3,398,724
ROTARY PISTON INTERNAL-
COMBUSTION ENGINE
Heinz Lamm, Esslingen-St. Bernhardt, Lothar Kortner, Stuttgart-Bad Cannstatt, and Hubert Zu Hohenlohe-Eschenau-Waldhof, Germany, assignors to Daimler-Benz Aktiengesellschaft, Stuttgart, Unterturkheim, Germany
Filed Oct. 12, 1966, Ser. No. 586,119
Claims priority, application Germany, Oct. 13, 1965, D 48,406
15 Claims. (Cl. 123—8)

ABSTRACT OF THE DISCLOSURE

A rotary piston internal-combustion engine, especially of trochoidal construction in which within a housing having lateral parts and a casing with a multiarched internal surface that includes zones approaching the axis of the engine, a piston provided with piston recesses in its flanks is supported on the eccentric of an eccentric shaft, whereby the piston during its movement relative to the casing and to the eccentric shaft slides with its corners at the casing surface and thereby controls gas exchange channels arranged within one of the areas of a zone near the axis; each piston recess is of approximately rectangular configuration as viewed in plan view while the depth of the recess increases steadily from one side adjacent one piston corner up to a predetermined point and remains substantially constant up to the portion adjacent the other piston corner; the cross section of the portion of the piston recess which changes in depth is preferably substantially triangular while the cross section of the piston recess of substantially constant depth is approximately trapezoidal.

The present invention relates to a rotary piston internal-combustion engine, especially of trochoidal construction in which, within a housing provided with lateral parts and with a casing having a multiarched internal casing surface that includes zones approaching the axis of the engine, a polygonal piston provided with piston recesses in the flanks thereof is rotatably supported on the eccentric of an eccentric shaft, which piston during its movement relative to the casing and to the eccentric shaft slides with its corners along the casing surface and thereby controls the gas exchange channels arranged within the area of one of the zones approaching the axis.

Piston troughs or recesses in the flanks of pistons for rotary piston internal-combustion engines, especially for those of trochoidal construction, have principally the purpose of assisting during the suction stroke or phase in the task of producing vortices or eddies in the sucked-in combustion air or in the sucked-in fuel-combustion air in the interest of a good mixture preparation, of connecting with each other at the end of the compression stroke or phase the portions of the compression space separated from each other by the zone of the casing approaching the axis and of assuring during the short period of the highest pressure as complete as possible a combustion in the interest of slight fuel consumption and high power output and efficiency.

It has not been possible heretofore to impart to a piston trough or recess such a shape that all of the demands made thereof are solved equally well, because, for example, a mixture preparation by means of eddying or vortexing requires, as such, a different piston recess shape than requirements for a complete combustion in connection with which it is essential that the ignition flame is brought into contact rapidly and without losses with all the gases present in the combustion space and that the bottom of the piston recess is as far removed as possible from the spark plug at the moment of ignition.

The present invention aims at creating a piston recess or trough corresponding to all requirements with equal efficacy, and the underlying problems are solved in accordance with the present invention in that each piston trough or recess (a) is constructed—as viewed in plan view on the piston flank—especially rectangularly lying or disposed in the longitudinal direction of the piston flank;

(b) the depth of the piston recess from the side, which is adjacent to a piston corner, increases steadily up to a predetermined point and from there has the same depth up to the opposite side which is adjacent to the other piston corner; and (c) the cross section of the piston recess is constructed in that portion of the piston recess which becomes steadily deeper, of triangular shape in the manner of an isosceles triangle placed on its apex or peak and the cross section in the portion of substantially constant depth is of trapezoidal shape with constantly increasing length of the base or bottom side of the trapezoid.

With such a piston recess in the piston flank the gas which flows in through the inlet into the working chamber is outwardly deflected during the suction stroke at the leading end of the piston recess so that it contacts the casing surface. Since the casing surface has a rotary velocity which is oppositely directed relative to the piston, a forceful vortex or eddy is produced thereby about an axis parallel to the center longitudinal axis of the piston. After the closing of the inlet, there exists above the leading end of the piston recess a gas stream of higher velocity which flows opposite the direction of rotation of the piston. Since the spark plug is arranged as a rule ahead of the zone approaching the axis, the ignition takes place over the part of the piston recess which is constructed triangularly in cross section. The distance of the bottom of the piston recess from the spark plug is thereby relatively large; nevertheless, by reason of the small cross-sectional surfaces, large gas velocities are present which carry the ignition flame into the part of the piston recess which is constructed of trapezoidal shape in cross section. Unburned gas is transported or supplied rapidly and without loss from the trailing part of the piston flank to the flame since no sharp edges are present at the piston recess which might impair the gas velocity. In order to keep small the throttle losses by the high gas velocity, the velocity peaks are intentionally limited by the special shape of the piston recess to the area in which they are needed.

As determined by tests with a piston recess according to the present invention, the expected advantages occur during the suction, the compression, and the combustion or burning. And more particularly, this is the case when the portion of the piston trough or recess which is trapezoidal in cross section, is the leading portion of the piston recess in relation to the direction of rotation of the piston, but these advantages also occur when a reversed position is chosen. In the latter case, the spark plug is located at the ignition moment above the portion of the piston recess which has a trapezoidally shaped cross section. Such low gas velocities prevail thereat that the ignition flame is able to stream or move opposite the direction of rotation of the piston so that also a rapid and complete combustion can be effected with low consumption and high output.

According to a further feature and development of the present inventive concept, the portion of the piston recess which is triangularly shaped in cross section may commence relatively near to the one piston corner and the end of the portion of the piston recess which is trapezoidally shaped in cross section may have a spacing with respect to the other piston corner that is larger than the spacing of the triangularly shaped portion of the piston recess from the first-mentioned piston corner.

It is additionally advantageous if the piston recess occupies nearly the entire width of the piston flank.

According to a preferred feature of the present invention, the portion of the piston recess which is triangularly shaped in cross section, may be arranged in that part of the piston flank which is adjacent to the trailing piston corner.

Accordingly, it is an object of the present invention to provide a rotary piston internal-combustion engine which obviates, by simple means, the aforementioned shortcomings and drawbacks encountered with the prior art constructions.

It is another object of the present invention to provide a rotary piston internal-combustion engine which is completely satisfactory in operation and is capable of fulfilling all demands concerning contradictory requirements in the combustion processes.

A further object of the present invention resides in a rotary piston internal-combustion engine provided with piston recesses which not only assure a good mixture preparation by the creation of vortices, but also connects with each other the two portions of the compression space normally separated from each other at the end of the compression stroke and ensures a high output with as complete as possible a combustion.

Still another object of the present invention resides in a rotary piston internal-combustion engine of trochoidal construction in which a forceful vortex is produced in the piston recesses while at the same time a relatively large spacing of the bottom of the piston recess is provided from the spark plug without impairing the high gas velocity necessary for rapid spread of the ignition flame.

Still a further object of the present invention resides in a rotary piston internal-combustion engine in which all unburned gases are rapidly transported and carried to the ignition flame while at the same time throttle losses as a result of high gas velocities are minimized.

These and further objects, features, and advantages of the present invention will become more obvious from the following description when taken in connection with the accompanying drawing, which shows, for purposes of illustration only, two embodiments in accordance with the present invention, and wherein.

Figure 2:
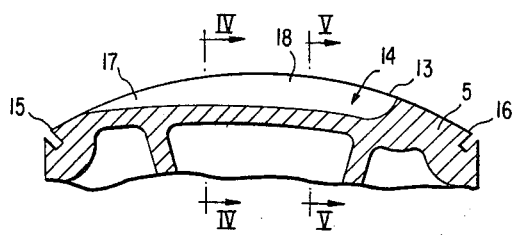
FIGURE 2 is a partial longitudinal cross-sectional view through a piston flank having a piston recess arranged therein in accordance with the present invention.
Figure 5:
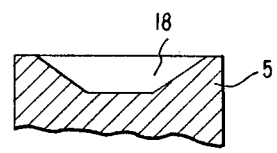
Figure 6:
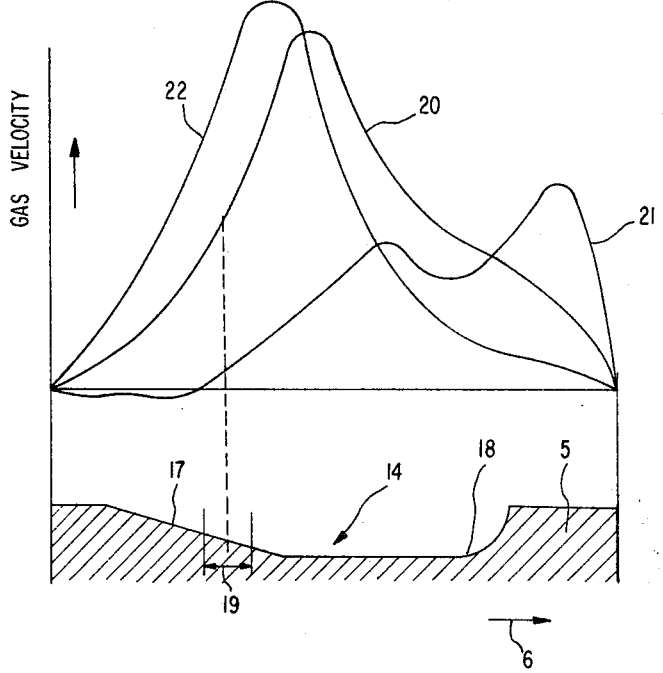
Figure 7:
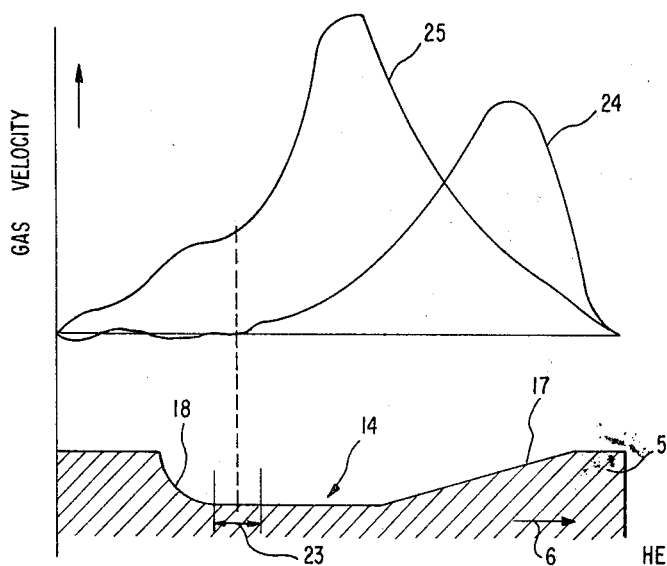

FIGURE 5 is a partial cross-sectional view through the piston flank taken along line V—V of FIGURE 2; and FIGURES 6 and 7 are diagrams indicating the average gas velocities above the profile of the piston recess in different positions of the piston at the end of the compression stroke in connection with two embodiments of the present invention having different arrangement of the piston recess in relation to the direction of rotation of the piston.

Figure 1:
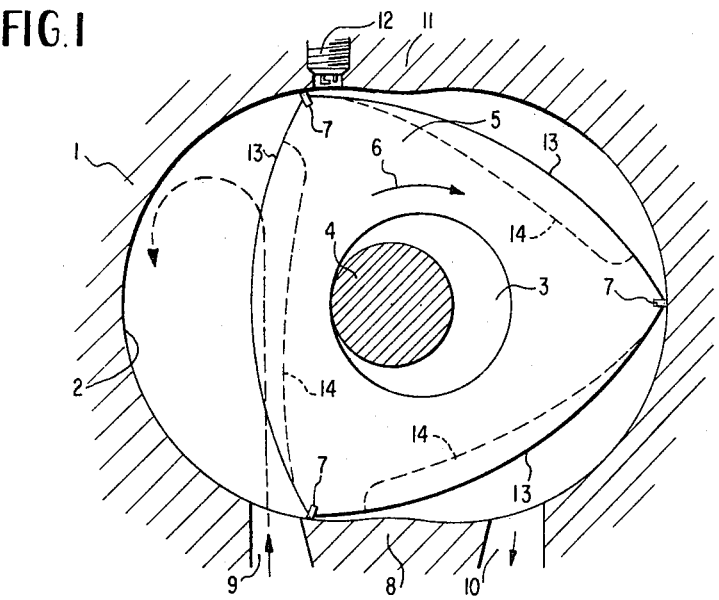
FIGURE 1 is a schematic cross-sectional view through a rotary piston internal-combustion engine of trochoidal construction in accordance with the present invention.

Referring now to the drawing wherein like reference numerals are used throughout the various views to designate like parts, and more particularly to FIGURE 1, this figure schematically illustrates a rotary piston internal-combustion engine of trochoidal construction in which the housing casing 1 is provided with a two-arched internal casing surface 2. The triangular piston 5 is rotatably supported on the eccentric 3 of the eccentric shaft 4 within the housing of the internal-combustion engine constituted by the housing casing 1 and by two conventional lateral parts thereof. The piston 5 is controlled in its rotation relative to the eccentric shaft 4 by means of a conventional transmission and rotates relative to the housing in the direction of arrow 6; during such rotation, the piston 5 slides with the radial seals 7 arranged at its corners along the casing surface 2 and thereby controls or valves the inlet channel 9 and the outlet channel 10 arranged within the area of the zone 8 approaching the axis of the engine. Opposite the zone 8 approaching the axis is disposed the other zone 11 approaching the axis. The spark plug 12 is arranged ahead of the zone 11 approaching the axis. The piston recesses generally designated by reference numeral 14 are arranged in the flanks 13 of the piston 5.

Figure 4:
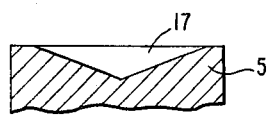
FIGURE 4 is a partial cross-sectional view through the piston flank taken along line IV—IV of FIGURE 2.
Figure 3:
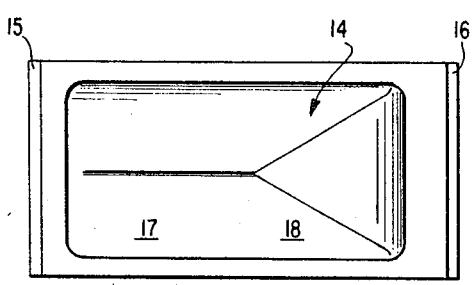
FIGURE 3 is a partial plan view on the piston flank of FIGURE 2.

As becomes more clear from FIGURES 2 and 3 in connection with FIGURES 4 and 5, the piston recess 14 in the piston flank 13 of the piston 5 is constructed—as viewed in plan view on the piston flank—essentially of rectangular shape lying or disposed in the longitudinal direction of the piston flank. The depth of the piston recess 14 increases steadily from the side thereof located in proximity to the trailing piston corner 15 up to approximately half the length of the piston flank, and thereupon remains substantially constant up to a point where the piston recess 14 terminates with a rounded-off portion within the area of the leading piston corner 16. Within the section 17 having a continuously increasing depth, the piston recess 14 is of triangular shape in cross section in the manner of an isosceles triangle placed on its peak or apex. In the adjoining section 18 of the piston recess 14, the cross section thereof is of trapezoidal shape with a steadily increasing length of the base of the trapezoid.

If the piston recesses 14 are arranged in the piston 5 in such a manner that according to FIGURE 1 in relation to the direction of rotation of the piston, the piston recess portion 18 is located in the leading portion of the piston flank 13 and the spacing or distance of the piston recess 14 according to FIGURE 2 is larger to the leading piston corner 16 than to the trailing piston corner 15, then the ignition takes place by means of the spark plug 12 and, depending on the rotational speed of the engine, more or less ahead of the upper dead-center positioned at an instant in which the respective piston flank of the piston is located approximately with its piston recess section 17 below the spark plug 12. This area is designated in FIGURE 6 by reference numeral 19. It is also possible to recognize further from FIGURE 6 that the velocity of the gases above the piston flank 13 in the direction from the trailing piston corner 15 up to the leading piston corner 16 is relatively high as is shown by curve 20 which represents the average gas velocity during a period of time in which the piston flank 13 travels through the path corresponding to the position of the piston between 20° ahead of the upper dead-center position up to the upper-dead-center point, whereby the positive gas velocity shown in FIGURE 6 means that the direction of flow proceeds from the piston corner 15 toward the piston corner 16. For purposes of comparison, there are additionally shown in FIGURE 6 the curve 21 which indicates the average gas velocity corresponding to piston positions of between 40° and 20° ahead of the upper dead-center position, and the curve 22 which indicates the average gas velocity between the upper dead-center position and 20° after the upper dead-center position. At the moment of ignition and of the pressure increase in the combustion space, a large gas velocity therefore prevails below the ignition place in the direction toward the leading piston corner. The gases impinging with high velocity on the ignition flame in effect blow the ignition flame out of the piston recess 18 so that in effect unburned gases are displaced without loss and relatively fast from the trailing piston corner to the ignition flame which itself is thus blown out of the piston recess portion 18.

If the piston recess, in contradistinction to the arrangement of FIGURES 1, 2, and 6 is so arranged in the piston flank that according to FIGURE 7 the piston recess section 17 is located in the leading portion of the piston flank 13, then at the moment of ignition, the piston recess section 18 lies approximately with its area 23 below the spark plug 12. The gas velocities above this area 23 lie between the curve 24 which represents the average gas velocity for piston positions between 40° to 20° ahead of the upper dead-center position, and the curve 25 which represents the average gas velocity for piston positions between 20° ahead of the upper dead-center position up to the upper dead-center position. These gas velocities are therefore so low that the ignition flame which has a considerably higher combustion velocity, is able to travel opposite the direction of rotation of the piston so that a rapid and complete combustion is achieved and a low consumption and high output is established.

While we have shown and described two embodiments in accordance with the present invention, it is understood that the same is not limited thereto but is susceptible of numerous changes and modifications as known to a person skilled in the art, and we therefore do not wish to be limited thereto but intend to cover all such changes and modifications as are encompassed by the scope of the appended claims.

We claim:
1. A rotary piston internal-combustion engine, especially of trochoidal construction, comprising housing means having lateral housing parts and casing means provided with multiarched inner casing surface means, said casing surface means being provided with zones approaching the axis of the engine, gas exchange channel means in said housing means, polygonal piston means provided with piston recess means in the piston flanks thereof, eccentric shaft means including eccentric means for rotatably supporting thereon said piston means in such a manner that during movement of the piston means relative to said case means and to said essentric shaft means, said piston means slides with its corners along the casing surface means and thereby controls the gas-exchange channel means located within the area of one of said zones within said housing means, said piston recess means being of approximately rectangular configuration as viewed in plan view of the piston flank, the depth of said recess means increasing steadily from one side adjacent one piston corner up to a predetermined point and remaining substantially constant up to the portion adjacent the other piston corner, the cross section of the portion of the piston recess means which changes its depth being of essentially triangular configuration and the cross section of the piston recess means of substantially constant depth being of approximately trapezoidal shape.

2. A rotary piston internal-combustion engine according to claim 1, wherein the portion of the piston recess means of triangular shape has approximately the shape of an isosceles triangle placed on its apex and the portion of trapezoidal shape being of such configuration that the length of the base of the trapezoid increases substantially steadily.

3. A rotary piston internal-combustion engine according to claim 2, wherein the portion of the piston recess means which is of triangular shape in cross section commences relatively close to the respective piston corner and that the end of the portion of the piston recess means which is trapezoidal in cross section has a spacing from the other piston corner which is greater than the spacing of the triangular shaped portion of the piston recess means from the first-mentioned piston corner.

4. A rotary piston internal-combustion engine according to claim 3, wherein said piston recess means occupies nearly the entire width of the piston flank.

5. A rotary piston internal-combustion engine according to claim 4, wherein the portion of the piston recess means of triangular shape is arranged in the portion of the piston flank which is adjacent the trailing piston corner.

6. A rotary piston internal-combustion engine according to claim 3, wherein the portion of the piston recess means of triangular shape is arranged in the portion of the piston flank which is adjacent to the leading piston corner.

7. A rotary piston internal-combustion engine according to claim 1, wherein the portion of the piston recess means which is of triangular shape in cross section commences relatively close to the respective piston corner and that the end of the portion of the piston recess means which is trapezoidal in cross section has a spacing from the other piston corner which is greater than the spacing of the triangular shaped portion of the piston recess means from the first-mentioned piston corner.

8. A rotary piston internal-combustion engine according to claim 7, wherein said piston recess means occupies nearly the entire width of the piston flank.

9. A rotary piston internal-combustion engine according to claim 8, wherein the portion of the piston recess means of triangular shape is arranged in the portion of the piston flank which is adjacent the trailing piston corner.

10. A rotary piston internal-combustion engine according to claim 2, wherein the portion of the piston recess means of triangular shape is arranged in the portion of the piston flank which is adjacent to the leading piston corner.

11. A rotary piston internal-combustion engine according to claim 1, wherein said piston recess means occupies nearly the entire width of the piston flank.

12. A rotary piston internal-combustion engine according to claim 1, wherein the portion of the piston recess means of triangular shape is arranged in the portion of the piston flank which is adjacent the trailing piston corner.

13. A rotary piston internal-combustion engine according to claim 1, wherein the portion of the piston recess means of triangular shape is arranged in the portion of the piston flank which is adjacent to the leading piston corner.

14. A rotary piston internal-combustion engine according to claim 2, wherein the portion of the piston recess means of triangular shape is arranged in the portion of the piston flank which is adjacent the trailing piston corner.

15. A rotary piston internal-combustion engine according to claim 2, wherein the portion of the piston recess means of triangular shape is arranged in the portion of the piston flank which is adjacent to the leading piston corner.

References Cited
UNITED STATES PATENTS

| | | | |
|---|---|---|---|
| 3,196,852 | 7/1965 | Bentele | 123—8 |
| 3,319,610 | 5/1967 | Hejj | 123—8 |

RALPH D. BLAKESLEE, *Primary Examiner.*